UNITED STATES PATENT OFFICE.

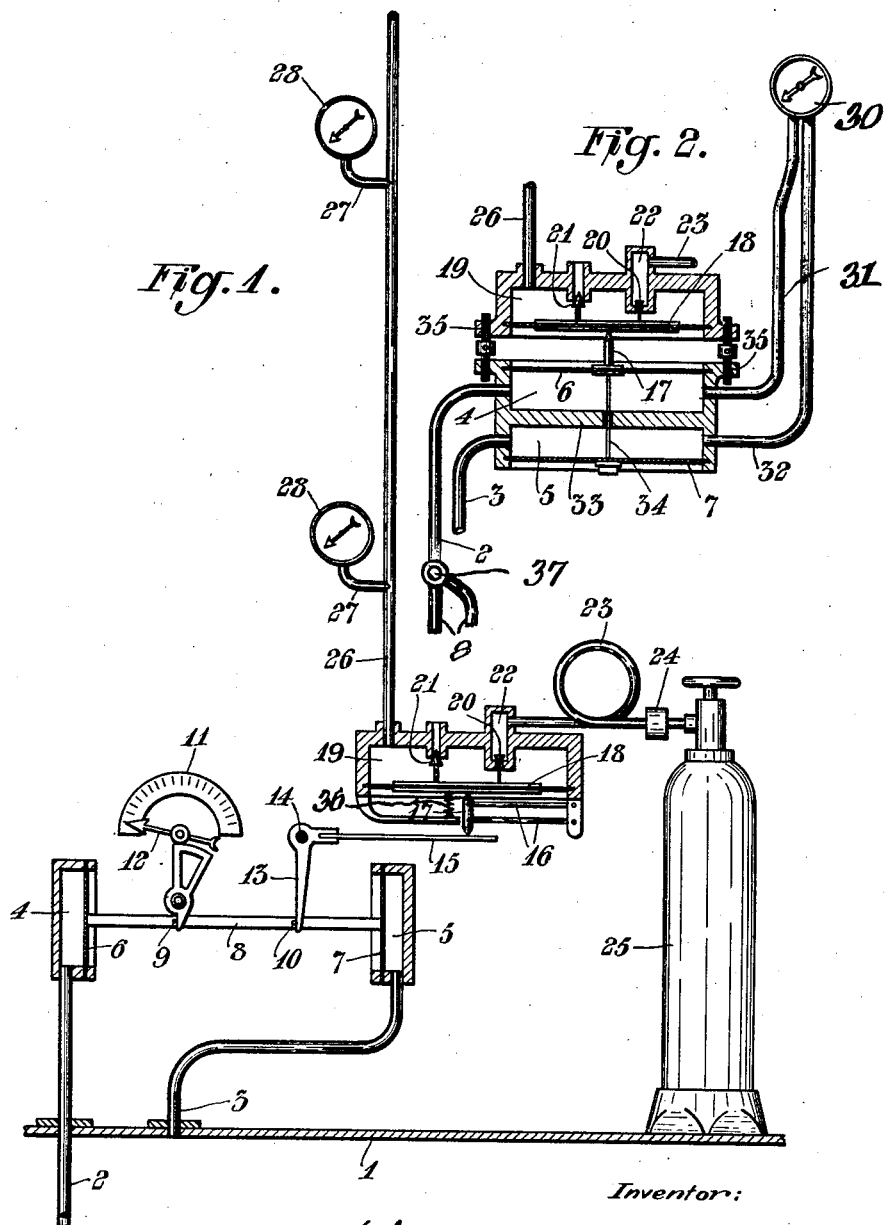

JOHN FRITIOF NÄSSÉN, OF SPÅNGA, SWEDEN, ASSIGNOR OF TWO-THIRDS TO ANDERS LINDAHL, OF STOCKHOLM, SWEDEN.

LOG AND THE LIKE.

1,319,241. Specification of Letters Patent. Patented Oct. 21, 1919.

Application filed October 18, 1916. Serial No. 126,305.

*To all whom it may concern:*

Be it known that I, JOHN FRITIOF NÄSSÉN, a subject of the King of Sweden, residing at Spånga, in the Kingdom of Sweden, have invented a new and useful Improvement in Logs and the like, of which the following is a specification.

This invention relates to logs indicating automatically the speed of a vessel. Heretofore logs have been constructed which comprise a Pitot pipe and another pipe indicating only the hydrostatic pressure, said pipes opening in the bottom of the vessel and being so connected with two diaphragms movable synchronously that the deflection of the diaphragms depends on the difference between the pressures in the two pipes. This difference of pressure is transmitted by one of the diaphragms to a closed pipe system containing a liquid and a number of manometers. This known system is, however, subject to the heavy disadvantage that even a small leak in the closed pipe system will cause incorrect indication of the manometers. Besides, the manometers will, when the pipe is filled with a liquid, be sensitive to the rolling of the vessel in a high sea and to the changes of temperature and volume in the pipe system.

The object of this invention is the provision of a log of the aforesaid type in which the diaphragm or diaphragms (preferably two in number), when moving, actuate a valve device or the like controlling the connections, on the one hand, between a source of pressure fluid and the pipe system provided with the manometers, and, on the other hand, between said pipe system and the open air. By this arrangement it is attained that the influence of leaks, which might occur in the pipe system is neutralized, since any pressure fluid escaping through a leak is instantly replaced from the source of pressure fluid. As pressure fluid, liquid carbonic acid contained in a suitable receiver is specially suitable, but other fluids, as for example compressed air, may be used. Since under normal circumstances the consumption thereof is very small, the contents of such a common receiver containing fluid carbonic acid will last a long time.

Two different embodiments of the invention are illustrated in the accompanying drawing in which Figures 1 and 2 are side-views of the log, certain parts being shown in section.

Referring first to Fig. 1, 1 is the bottom of a vessel. Through said bottom passes a Pitot pipe 2 whose opening is directed forward (in the direction of movement of the vessel) and a pipe 3 whose opening is directed downward, the latter pipe thus being responsive only to the hydrostatic pressure. Each of the upper ends of the two pipes 2 and 3 opens into a diaphragm box 4 and 5 respectively. One wall of each box consists of an easily movable diaphragm 6 and 7 respectively. As will appear from Fig. 1, said diaphragms are so located in relation to each other that they may be connected by a rod 8 without the use of stuffing boxes or other devices causing frictional resistance. The two diaphragms are of equal size and also in other respects of equal qualities, and, on account thereof, the play of the rod 8 to the right in Fig. 1, on the movements of the vessel, will depend only on the speed pressure, whereas the hydrostatic pressure is eliminated.

Inserted into the rod 8 are two pins 9 and 10, or the like, of which the pin 9, by the aid of a toothed wheel gear, actuates a pointer 12 movable on a scale 11. Bearing against the other pin 10 is one arm 13 of a bell crank lever whose other arm consists of a spring 15 which, by means of a connecting piece 17 guided in any suitable manner, for instance by two pivotally mounted arms 16, actuates a diaphragm 18 forming one wall of a valve box 19. Connected with the diaphragm 18 at each side of the contact point of the connecting piece 17 are two valves 20 and 21 opening in opposite directions. The valve 20 controls the connection between a separate chamber 22 communicating through a pipe 23 having a reduction valve 24 with the carbonic acid receiver 25, and the valve box 19, while the valve 21 controls the connection between the diaphragm box and the open air. The box 19 is further provided with a pipe 26 connected by means of branch pipes 27 with the manometers 28. The latter placed at different points within the vessel are graduated so as to indicate directly the speed of the vessel.

When the vessel is at rest, the liquid pressures in the two diaphragm boxes 4 and 5 are equal, and the diaphragms 6 and 7 occupy the position of equilibrium shown in the drawing. The pointer 12 as well as the manometers 28 indicate zero; if not, the latter may be adjusted in correspondence with the pointer. When the vessel is moving forward, the pressure actuating the diaphragm 6 is increased, which results in the rod 8 being moved to the right in Fig. 1. Said movement is transmitted through the bell crank lever 13, 15 and the connecting piece 17 to the diphragm 18, which is turned upward about the valve cone 21 forming the center of rotation, and on account thereof the valve 20 is opened. The carbonic acid flows then from the chamber 22 to the valve box 19 and through the pipe system 26, 27 to the different manometers 28. The carbonic acid contained in the valve box 19 will, however, at the same time cause a pressure on the upper side of the diaphragm 18, and at the moment, when said pressure becomes equal to the pressure of the spring 15 on the underside of the diaphragm 18, the valve is again closed. The pressure in the pipe system has now attained such a value that the manometers 28 indicate the speed of the vessel corresponding to the movement of the rod 8. If the speed of the vessel be increased, the rod 8 is moved farther to the right and the valve 20 is opened once more. Owing thereto the pressure in the pipe system is increased and the manometers indicate the increased speed.

If, on the contrary, the speed of the vessel decreases, the pressure actuating the diaphragm 6 is reduced and the rod 8 is moved to the left. On account thereof the pressure of the spring 15 on the underside of the diaphragm 18 is reduced and in consequence of the pressure on the upper side of the diaphragm 18 the latter is turned downward about the valve 20 forming the center of rotation, so that the valve 21 is opened and part of the carbonic acid contained in the pipe system and the valve box 19 escapes to the open air. The pressure in the pipe system is reduced, and the manometers 28 indicate the reduced speed. Thus the pressure in the pipe system will depend on the speed of the vessel. Obviously, a small leak in the pipe system or a change of its volume, for instance caused by any outer damage exercised on an uncovered place of the pipe, so as to flatten the same, will have no influence on the manometers, since the valve device 18, 20, 21 always admits or discharges even so large a quantity of carbonic acid, that the correct pressure in the pipe system corresponding to the speed is attained.

Fig. 2 shows a somewhat simplified embodiment of the invention which differs from that described above in that the diaphragm boxes 4 and 5 are made integral with each other and separated by a partition-wall 33. Passing through a fine aperture in said wall is a pin or wire 34 connecting the two diaphragms 6 and 7. The movements of the diaphragms 6 and 7 are transmitted to the diaphragm 18 directly by the connecting piece 17 without the use of intermediate levers. The diaphragm boxes 4 and 5 and the valve box 19 are adjustable in relation to each other by means of screws 35 having right- and left-handed threads. This constructional form offers the advantage that the movements of the diaphragms 6 and 7 are not so extensive as in the construction described above, and therefore the losses of power are reduced to a minimal value.

The embodiments of the invention described above and shown in the drawing may be further modified in several respects without deviating from the principles of the invention. Thus for instance the meter 11, 12 operated by a gear driven by the rod 8 as shown in Fig. 1 may be replaced by a differential manometer 30 as shown in Fig. 2 connected through two pipes 31 and 32 with the diaphragm boxes 4 and 5 respectively. In correspondence with said manometer 30 which indicates the speed of the vessel as exactly and correctly as possible the other manometers may be adjusted.

In order to cause the manometers to give correct indications, even in case of very small speeds, the valve device may suitably be so constructed, that a certain initial pressure prevails in the valve box 19 and the pipe system 26, 27, even in case the speed of the vessel be equal to zero. This will for instance be obtained by means of an auxiliary spring 36 as shown in Fig. 1 operating the diaphragm 18 and moving it upward with a certain power corresponding to the initial pressure desired.

If it be desired that the log shall indicate the speed of the vessel, also when the vessel is going backward, two Pitot pipes may be used having their openings directed oppositely, the pipes in such case being connected alternately for instance by means of a three-way cock 37 as shown in Fig. 2 with the diaphragm box 4, according as the vessel is going forward or backward.

As will easily be understood, the speed gage described above may advantageously be used for measuring the velocity of flow for instance of a river. If in this case two Pitot pipes be used, the apparatus may also indicate upward flow and its velocity.

Having now described my invention and how it may be carried out, what I claim and desire to secure by Letters Patents is:

1. A log, comprising a Pitot pipe, a pipe responsive to the hydrostatic pressure only, a diaphragm connected with each of said pipes and acted upon by the pressures in the same, a pipe system connected with the open air, a source of pressure fluid connected with said pipe system, means controlling the latter connection, means controlling the connection between the pipe system and the open air, and means actuated by the diaphragms and operating the said controlling means.

2. A log, comprising a Pitot pipe, a pipe responsive to the hydrostatic pressure only, a diaphragm connected with each of said pipes and acted upon by the pressures in the same, a pipe system connected with the open air, a number of indicators inserted into said pipe system and adapted to indicate the pressure in the same, a source of pressure fluid connected with said pipe system, means controlling the latter connection, means controlling the connection between the pipe system and the open air, and means actuated by the diaphragms and operating the said controlling means.

3. A log, comprising a Pitot pipe, a pipe responsive to the hydrostatic pressure only, a diaphragm connected with each of said pipes and acted upon by the pressures in the same, a pipe system connected with the open air, a number of manometers inserted into said pipe system and adapted to indicate the pressure in the same, a source of pressure fluid connected with said pipe system, a valve device controlling the latter connection, a valve device controlling the connection between the pipe system and the open air, and means actuated by the diaphragms and operating the said controlling valve devices.

4. A log, comprising a Pitot pipe, a pipe responsive to the hydrostatic pressure only, two diaphragms, one connected with each of said pipes and acted upon by the pressures in the same, a pipe system connected with the open air, a plurality of manometers in said pipe system and adapted to indicate the pressure in the same, a source of pressure fluid connected with said pipe system, a valve device controlling the latter connection, a valve device controlling the conection between the pipe system and the open air, and a diaphragm actuated by the first named diaphragms and adapted to open and close the said controlling valve devices alternately.

5. A log, comprising a Pitot pipe, a pipe responsive to the hydrostatic pressure only, two diaphragms, one connected with each of said pipes and acted upon by pressures in the same, a pipe system connected with the open air, a plurality of manometers inserted in said pipe system and adapted to indicate the pressure in the same, a source of pressure fluid connected with said pipe system, a valve device controlling the latter connection, a valve device controlling the connection between the pipe system and the open air, a valve box containing said controlling valve devices, a diaphragm forming one wall of said valve box, said valve box diaphragm being adapted to open and close said controlling valve devices alternately, and a member actuated by the first-named diaphragms and adapted to move said valve box diaphragm.

JOHN FRITIOF NÄSSÉN.